US012795318B2

(12) United States Patent
Vilermo et al.

(10) Patent No.: US 12,795,318 B2
(45) Date of Patent: Nov. 10, 2026

(54) AUDIO ZOOMING

(71) Applicant: Nokia Technologies Oy, Espoo (FI)

(72) Inventors: Miikka Tapani Vilermo, Tampere (FI); Jussi Artturi Leppänen, Tampere (FI); Arto Juhani Lehtiniemi, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 328 days.

(21) Appl. No.: 18/499,455

(22) Filed: Nov. 1, 2023

(65) Prior Publication Data

US 2024/0179488 A1 May 30, 2024

(30) Foreign Application Priority Data

Nov. 30, 2022 (EP) .................................... 22210560

(51) Int. Cl.
*H04S 7/00* (2006.01)

(52) U.S. Cl.
CPC ........... *H04S 7/304* (2013.01); *H04S 2400/11* (2013.01); *H04S 2400/15* (2013.01)

(58) Field of Classification Search
CPC ........ G06F 3/012; G06F 3/0304; G06F 3/165; H04S 7/304; H04S 2400/11; H04S 2400/15; H04M 1/72412; H04M 1/72454; H04M 1/6066; H04N 21/439; H04N 21/4394; H04R 3/005
USPC .......................................................... 381/303
See application file for complete search history.

(56) References Cited

U.S. PATENT DOCUMENTS

2017/0188138 A1 6/2017 Makinen et al.
2020/0374645 A1* 11/2020 Settel ...................... G06F 3/167
2022/0159403 A1* 5/2022 Sporer .................... H04S 7/302

FOREIGN PATENT DOCUMENTS

GB 2542579 A * 3/2017 ............ H04S 7/302

OTHER PUBLICATIONS

Wang, "Hybrid neural networks for on-device directional hearing", Proceedings of the AAAI Conference on Artificial Intelligence, vol. 36 No. 10, 2022, 9 pages.
Extended European Search Report received for corresponding European Patent Application No. 22210560.3, dated May 4, 2023, 9 pages.

* cited by examiner

*Primary Examiner* — Paul Kim
(74) *Attorney, Agent, or Firm* — ALSTON & BIRD LLP

(57) ABSTRACT

Examples of the disclosure relate to audio zooming with variable latency. In examples of the disclosure an apparatus is configured to determine if an audio source is within a given distance of a user device and select an audio zooming process for the audio source based on whether or not the audio source is within the given distance of the user device. The audio zooming process is selected such that, if the audio source is within the given distance of the user device a first audio zooming process is used and if the audio source is not within the given distance of the user device a second audio zooming process is used. The second audio zooming process has a higher latency than the first audio zooming process.

20 Claims, 5 Drawing Sheets

AUDIO ZOOMING

RELATED APPLICATION

Figure 1:
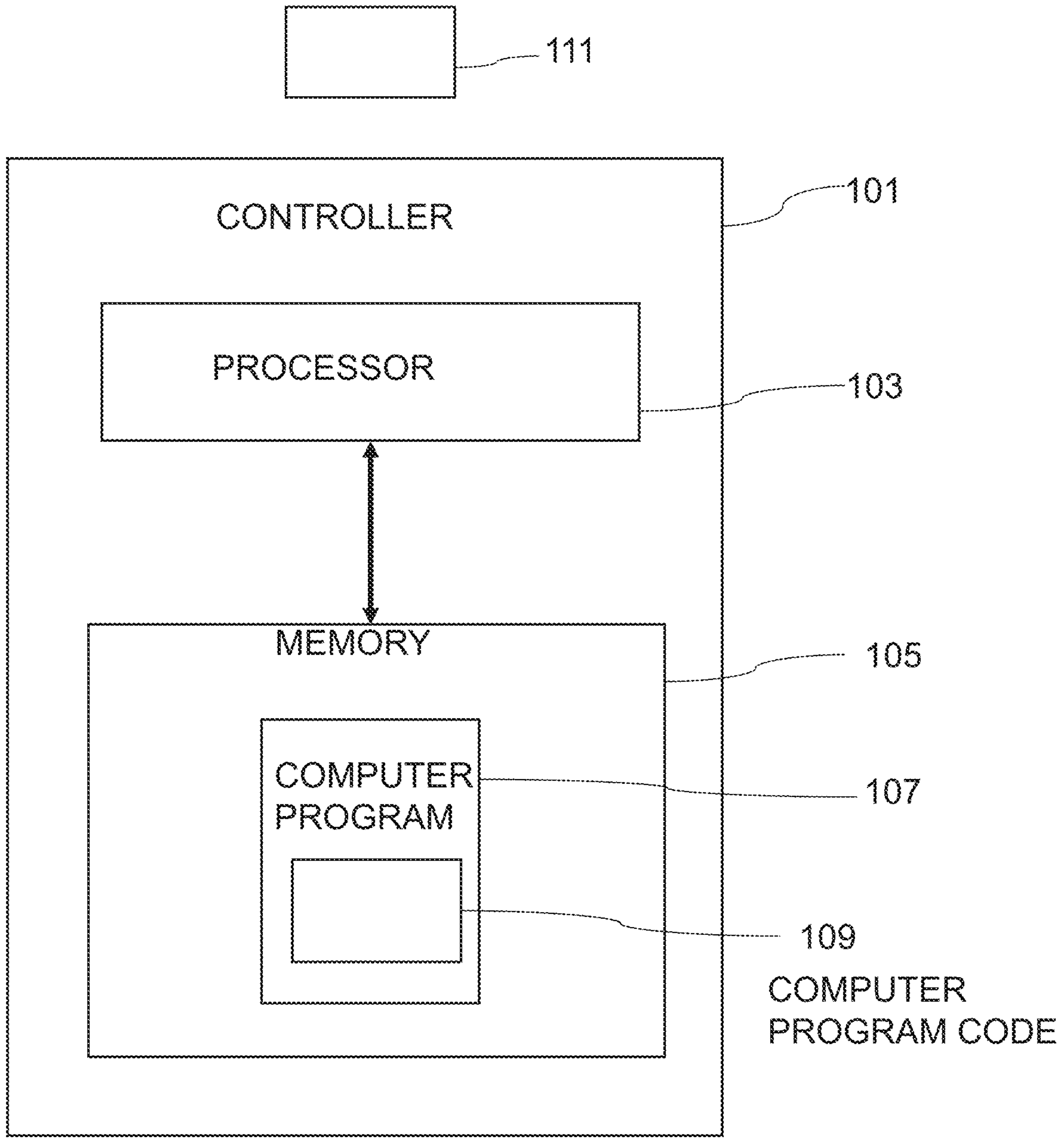

This application claims priority to European Patent Application No. 22210560.3, filed Nov. 30, 2022, which is incorporated herein by reference in its entirety.

TECHNOLOGICAL FIELD

Examples of the disclosure relate to audio zooming. Some relate to audio zooming with variable latency.

BACKGROUND

Audio zooming comprises the amplification of audio sources in a direction with respect to audio sources in other directions. Methods that can be used for audios zooming comprise beamforming, spatial filtering, Machine Learning based methods or any other suitable process.

BRIEF SUMMARY

According to various, but not necessarily all, examples of the disclosure there may be provided an apparatus comprising means for:

determining if an audio source is within a given distance of a user device; and selecting an audio zooming process for the audio source based on whether or not the audio source is within the given distance of the user device such that, if the audio source is within the given distance of the user device a first audio zooming process is used and if the audio source is not within the given distance of the user device a second audio zooming process is used, wherein the second audio zooming process has a higher latency than the first audio zooming process.

The second audio zooming process may provide a higher level of audio zooming than the first audio zooming process.

The first audio zooming process may comprise no audio zooming.

The first audio zooming process may comprise a pass-through mode.

The means may be for using a mix of the first audio zooming process and the second audio zooming process for an audio source that is not within the given distance but is within a further distance of the user device.

The means may be for controlling the combination so that a higher level of audio zooming is applied to audio sources that are further away from the user device.

The means may be for detecting one or more characteristics of the audio source and attenuating the one or more characteristic from non-zoomed audio.

The characteristics may comprise characteristics of human voice.

The means may be for determining an audio source that a user is listening to, wherein determination is based on the user's head position.

The audio zooming may comprise at least one of: beamforming, spatial filtering, machine learning based methods.

According to various, but not necessarily all, examples of the disclosure there may be provided an electronic device comprising an apparatus as claimed in any preceding claim.

According to various, but not necessarily all, examples of the disclosure there may be provided a method comprising:

determining if an audio source is within a given distance of a user device; and selecting an audio zooming process for the audio source based on whether or not the audio source is within the given distance of the user device such that, if the audio source is within the given distance of the user device a first audio zooming process is used and if the audio source is not within the given distance of the user device a second audio zooming process is used, wherein the second audio zooming process has a higher latency than the first audio zooming process.

According to various, but not necessarily all, examples of the disclosure there may be provided a computer program comprising instructions which, when executed by an apparatus, cause the apparatus to perform at least:

determining if an audio source is within a given distance of a user device; and selecting an audio zooming process for the audio source based on whether or not the audio source is within the given distance of the user device such that, if the audio source is within the given distance of the user device a first audio zooming process is used and if the audio source is not within the given distance of the user device a second audio zooming process is used, wherein the second audio zooming process has a higher latency than the first audio zooming process.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION

Figure 2:
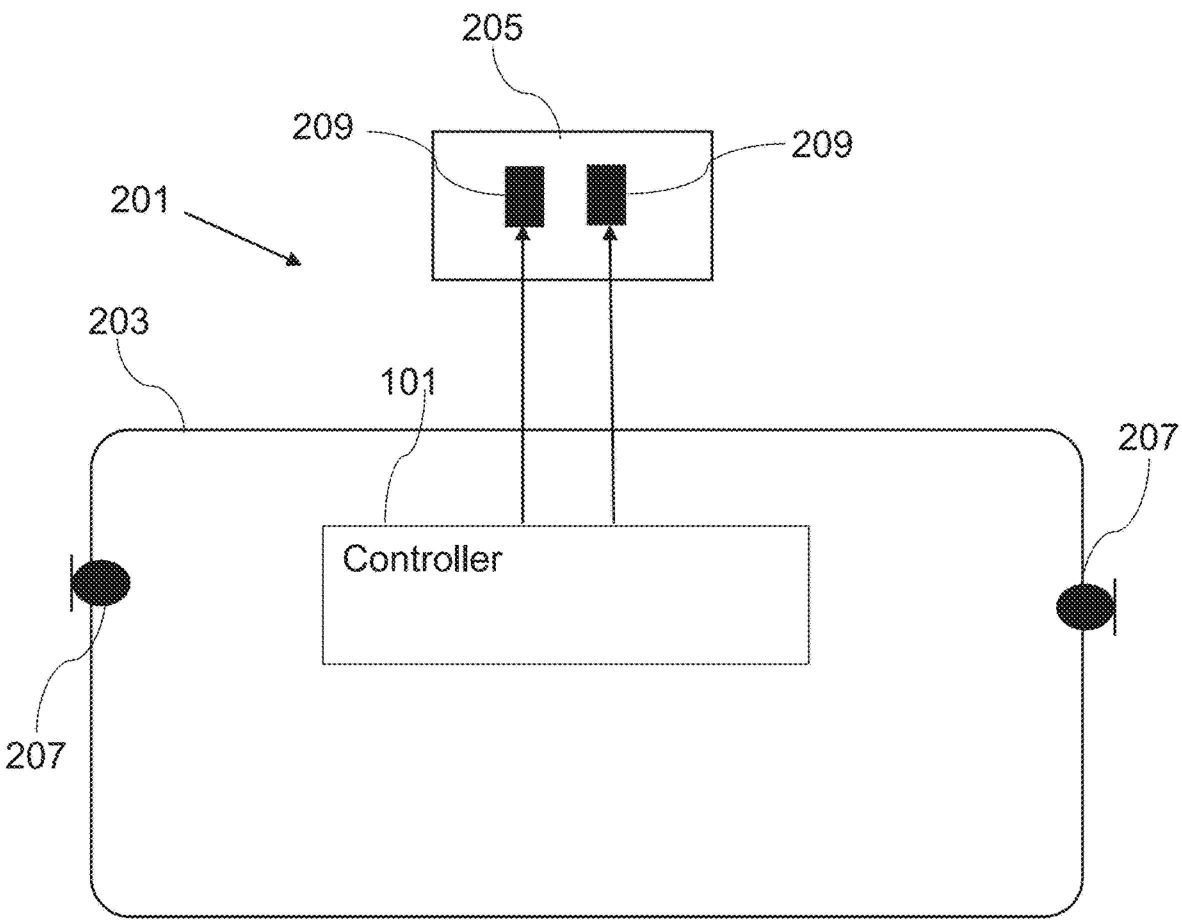
Figure 3:
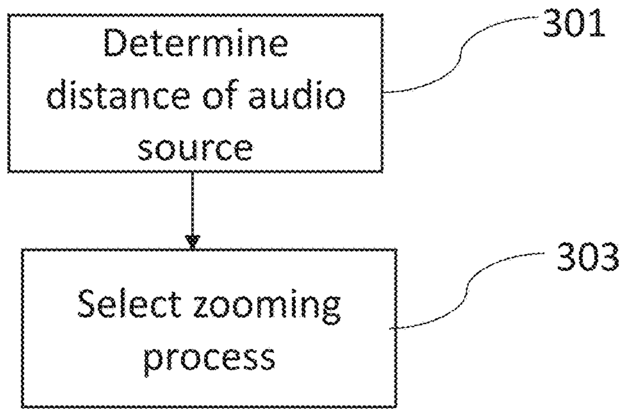
Figure 4:
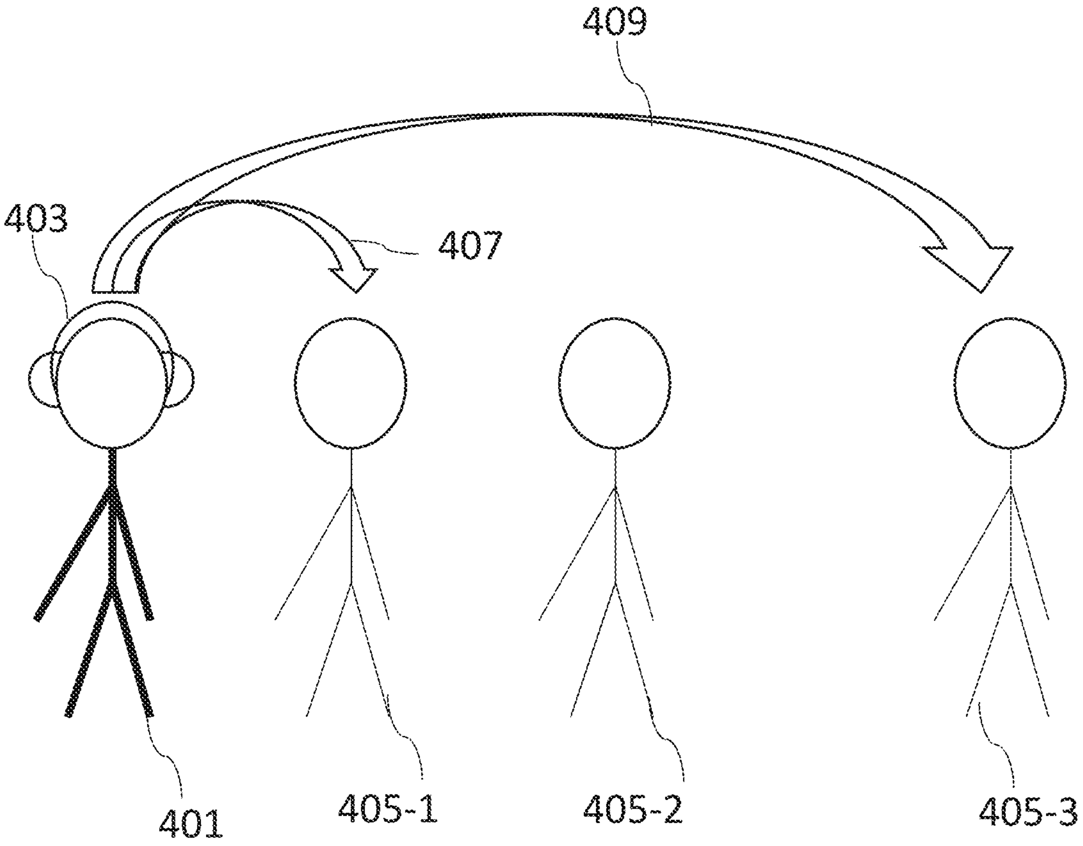
Figure 5:
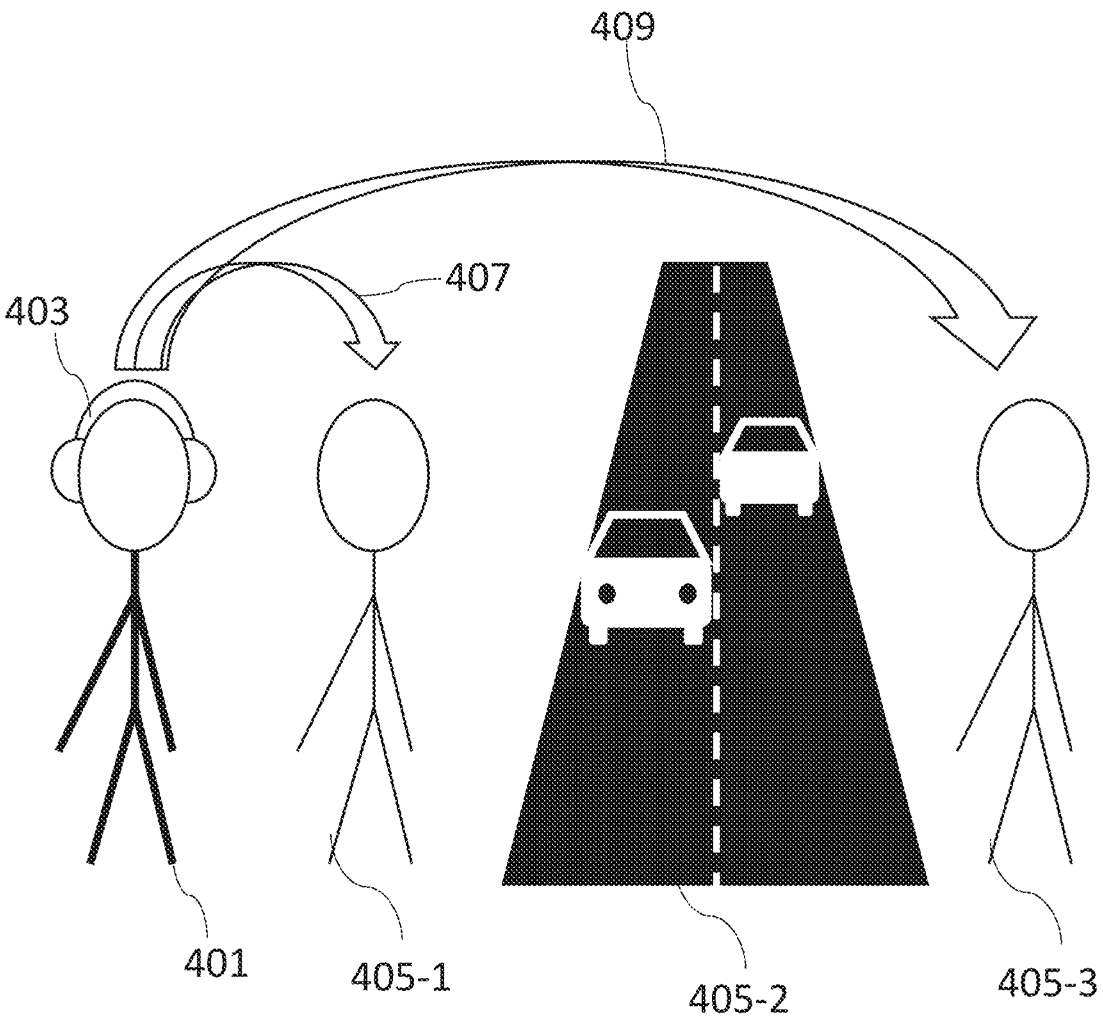
Figure 6:
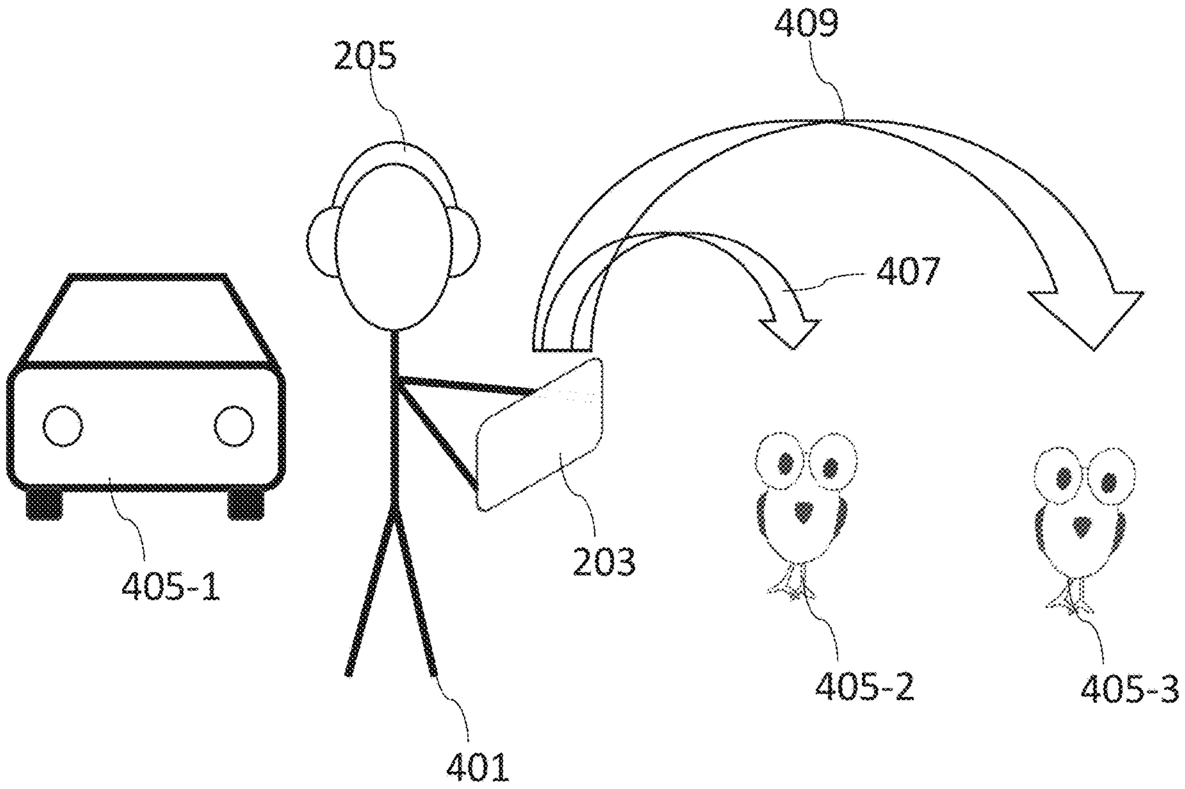

Some examples will now be described with reference to the accompanying drawings in which:

FIG. 1 shows an example apparatus;
FIG. 2 shows an example electronic device;
FIG. 3 shows an example method;
FIG. 4 shows an example use case;
FIG. 5 shows an example use case; and
FIG. 6 shows an example use case.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Corresponding reference numerals are used in the figures to designate corresponding features. For clarity, all reference numerals are not necessarily displayed in all figures.

DETAILED DESCRIPTION

Examples of the disclosure relate to audio zooming. Audio zooming can comprise amplifying audio sources that arrive from a particular direction compared to audio sources that do not arrive from that particular direction. This can increase the audibility of the audio sources that have been zoomed for a user compared to the non-zoomed audio. Audio zooming can be useful in scenarios such as a crowded audio scene where there are lots of audio sources but a user wants to focus on a particular audio source, or if the audio source that a user wants to focus on is far away or in any other suitable scenario.

Any suitable process can be used to implement audio zooming. For instance, audio zooming could be implemented using beamforming, spatial filtering, machine learning based methods or any other suitable process or combinations of processes.

Some audio zooming methods can introduce high levels latency into the audio signals. This can be undesirable.

FIG. 1 schematically shows an example apparatus 101 that could be used in some examples of the disclosure. The apparatus 101 can be a controller that can be configured to control an electronic device. In the example of FIG. 1 the apparatus 101 comprises at least one processor 103 and at least one memory 105. It is to be appreciated that the apparatus 101 could comprise additional components that are not shown in FIG. 1.

The apparatus 101 can be configured to implement examples of the disclosure. The apparatus 101 can be configured to enable audio zooming according to examples of the disclosure and/or to perform any other suitable functions.

In the example of FIG. 1 the implementation of the apparatus 101 can be implemented as processing circuitry. In some examples the apparatus 101 can be implemented in hardware alone, have certain aspects in software including firmware alone or can be a combination of hardware and software (including firmware).

As illustrated in FIG. 1 the apparatus 101 can be implemented using instructions that enable hardware functionality, for example, by using executable instructions of a computer program 107 in a general-purpose or special-purpose processor 103 that can be stored on a computer readable storage medium (disk, memory etc.) to be executed by such a processor 103.

The processor 103 is configured to read from and write to the memory 105. The processor 103 can also comprise an output interface via which data and/or commands are output by the processor 103 and an input interface via which data and/or commands are input to the processor 103.

The memory 105 is configured to store a computer program 107 comprising computer program instructions (computer program code 109) that controls the operation of the apparatus 101 when loaded into the processor 103. The computer program instructions, of the computer program 107, provide the logic and routines that enables the apparatus 101 to perform the methods illustrated in FIG. 3. The processor 103 by reading the memory 105 is able to load and execute the computer program 107.

The apparatus 101 therefore comprises: at least one processor 103; and at least one memory 105 including computer program code 109, the at least one memory 105 storing instructions that, when executed by the at least one processor 103, cause the apparatus 101 at least to:

determining 301 if an audio source is within a given distance of a user device; and selecting 303 an audio zooming process for the audio source based on whether or not the audio source is within the given distance of the user device such that, if the audio source is within the given distance of the user device a first audio zooming process is used and if the audio source is not within the given distance of the user device a second audio zooming process is used, wherein the second audio zooming process has a higher latency than the first audio zooming process.

As illustrated in FIG. 1 the computer program 107 can arrive at the apparatus 101 via any suitable delivery mechanism 111. The delivery mechanism 111 can be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 107. The delivery mechanism can be a signal configured to reliably transfer the computer program 107. The apparatus 101 can propagate or transmit the computer program 107 as a computer data signal. In some examples the computer program 107 can be transmitted to the apparatus 101 using a wireless protocol such as Bluetooth, Bluetooth Low Energy, Bluetooth Smart, 6LoWPan ($IP_v6$ over low power personal area networks) ZigBee, ANT+, near field communication (NFC), Radio frequency identification, wireless local area network (wireless LAN) or any other suitable protocol.

The computer program 107 comprises computer program instructions, which when executed by an apparatus, cause the apparatus 101 to perform at least the following:

determining 301 if an audio source is within a given distance of a user device; and selecting 303 an audio zooming process for the audio source based on whether or not the audio source is within the given distance of the user device such that, if the audio source is within the given distance of the user device a first audio zooming process is used and if the audio source is not within the given distance of the user device a second audio zooming process is used, wherein the second audio zooming process has a higher latency than the first audio zooming process.

The computer program instructions can be comprised in a computer program 107, a non-transitory computer readable medium, a computer program product, a machine readable medium. In some but not necessarily all examples, the computer program instructions can be distributed over more than one computer program 107.

Although the memory 105 is illustrated as a single component/circuitry it can be implemented as one or more separate components/circuitry some or all of which can be integrated/removable and/or can provide permanent/semi-permanent/dynamic/cached storage.

Although the processor 103 is illustrated as a single component/circuitry it can be implemented as one or more separate components/circuitry some or all of which can be integrated/removable. The processor 103 can be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" can refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit (s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software might not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in FIG. 3 can represent steps in a method and/or sections of code in the computer program 107. The illustration of a particular order to the blocks does not necessarily imply that there is a required or preferred order for the blocks and the order and arrangement of the block can be varied. Furthermore, it can be possible for some blocks to be omitted.

The apparatus can be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples, the apparatus can be provided in a mobile terminal, other types of electronic devices, such as, but not limited to: mobile communication devices, hand portable electronic devices, wearable computing devices, portable digital assistants (PDAs), pagers, mobile computers, desktop computers, televisions, gaming devices, laptop computers, cameras, video recorders, GPS devices and other types of electronic systems, can readily employ examples of the present disclosure. Furthermore, devices can readily employ examples of the present disclosure regardless of their intent to provide mobility.

FIG. 2 shows an example system 201 that can be used to implement examples of the disclosure. The system comprises an electronic device 203 and a peripheral device 205. In the example of FIG. 2 the electronic device 203 is shown as a separate device to the peripheral device 205. In this case signals processed by the electronic device 203 can be transmitted to the peripheral device 205 by any suitable connection. The connection could be a wireless communication link or any other suitable type of connection.

In the example of FIG. 2 the electronic device 203 comprises a controller 101 and two or more microphones 207. Only the components that are referred to in the following description are shown in FIG. 2. The electronic device 203 can comprise other components that are not shown in FIG. 2 for example the electronic device 203 could comprise one or more transceivers for receiving and/or transmitting signals such as audio signals.

The microphones 207 can comprise any means that can be configured to detect sound signals and convert these into audio signals. The audio signals can comprise electrical signals that are output by the microphones 207. The sound signals that are detected by the microphones 207 can originate from one or more audio sources.

The microphones 207 can be positioned relative to each other so as to provide audio signals that can be used for spatial audio. The audio signals provided by the microphones 207 comprise information about the spatial properties of the sound scene captured by the microphones 207.

In the example of FIG. 2 the microphones 207 are shown as part of the electronic device 203. In other examples one or more of the microphones 207 could be part of a different device. In such examples the audio signals from the microphones 207 that are not part of the electronic device 203 could be received by a transceiver of the electronic device 203 or could be received by any other suitable means.

The electronic device 203 is configured so that the audio signals from the microphones 207, or any other suitable source, can be provided to the controller 101 to enable processing of the audio signals.

The controller 101 can be an apparatus as shown in FIG. 1. The controller 101 can be configured to process the audio signals. The processing of the audio signals can comprise audio zooming according to examples of the disclosure. The controller 101 can also be configured to perform any other suitable functions. For example, it can be configured to control any other suitable functions of the electronic device 203 and/or to perform any other suitable processing on the audio signals.

The system 201 is configured so that the processed audio signals can be provided from the controller 101 to the peripheral device 205. The processed audio signals could be transmitted via a wireless connection or via any other suitable type of communication link.

The peripheral device 205 can comprise headphones, a headset or any other suitable device that comprises loudspeakers 209. The loudspeakers 209 can comprise any means that can be configured to convert electrical signals to output sound signals. In the example of FIG. 2 the loudspeakers 209 are configured to convert the processed audio signals from the controller 101 to sound signals. The loudspeakers 209 can provide a sound signal as an output. The sound signal can be audible to a user of the peripheral device 205.

In the example of FIG. 2 the peripheral device 205 comprises two loudspeakers 209. The loudspeakers 209 can be configured to enable playback of spatial audio to a user. A first loudspeaker 209 can be positioned in a first earpiece so that it can provide sound to a first ear of a user of the peripheral device 205 and the second loudspeaker can be positioned in a second earpiece so that if can provide sound to a second ear of the user of the peripheral device 205.

In the example of FIG. 2 the loudspeakers 209 are shown as part of the peripheral device 205. In other examples the loudspeakers 209 could be part of the electronic device 203. For instance, the loudspeakers 209 and controller 101 could be integrated as a headset or other suitable device.

In the example of FIG. 2 the controller is shown as part of the electronic device 203 so that the audio zooming processes according to examples of the disclosure are performed in the electronic device 203. In some cases the controller could be in the peripheral devices 205 so that the audio zooming can be performed in the peripheral device 205 or in a combination of the electronic device 203 and the peripheral device 205.

FIG. 3 shows an example method. The method could be implemented using the apparatus 101 and devices 203, 205 shown in FIGS. 1 and 2 or could be implemented using any other suitable means.

The method comprises, at block 301, determining if an audio source is within a given distance of a user device. The user device could be an electronic device 203 or a peripheral device 205 as shown in FIG. 2 or could be any other suitable type of device. The user device can be configured to process captured audio and/or enable the processed audio signals to be played back to a user.

At block 303 the method comprises selecting an audio zooming process for the audio source. The audio zooming process is selected based on whether or not the audio source is within the given distance of the user device. If the audio source is within the given distance of the user device then a first audio zooming process is used and if the audio source is not within the given distance of the user device a second audio zooming process is used. For instance, the first audio zooming process can be used if the audio source is close to the user device and the second audio zooming process can be used if the audio source is not close to the user device.

The first and second audio zooming processes are different from each other. The second audio zooming process has a higher latency than the first audio zooming process. The second audio zooming process can provide a higher level of audio zooming than the first audio zooming process. The higher level of audio zooming can increase the audibility of the zoomed audio compared to the non-zoomed audio by a larger amount. In some examples the first audio zooming process could comprise no audio zooming. The first audio zooming process could comprise a pass-through mode.

The respective audio zooming processes can comprise at least one of: beamforming, spatial filtering, machine learning based methods or any other suitable processes or combinations of processes.

In some examples the audio zooming process that is used to process the audio signals can comprise a combination of the first audio zooming process and the second audio zooming process. For instance, an audio source could be located at an intermediate distance from the user device. In such cases the audio source is not close to a user device but it might not be far away either. In such cases the audio sources might not be within the given distance of the user device but could still be within a further distance of the user device. In such cases the way in which the respective audio zooming processes are combined can be controlled so that a higher level of audio zooming is applied to audio sources that are further away from the user device.

In some examples the audio zooming process can comprise attenuating unwanted characteristics from the audio signals. In such examples, the apparatus 101 or controller can be configured to detect one or more characteristics of the audio source and attenuate the one or more characteristics from non-zoomed audio. The characteristics could comprise characteristics of human voices or any other suitable types of audio. The characteristics could comprise frequency bands or any other suitable characteristics.

In some examples the audio zooming can be applied so that it enhances an audio source that is of interest to a user of the user device. For instance, if there is more than one audio source in the area around the user then it can be determined which audio source the user is listening to so that the audio zooming can enhance that audio source. In some examples the audio source that a user is listening to can be determined based on the user's head position.

FIG. 4 shows an example use case scenario for examples of the disclosure. In FIG. 4 a user 401 is listening to audio playback though their user device 403. In this example the user device 403 comprises a set of headphones. Other types of user device 403 could be used in other examples. The user device can comprise a controller as shown above or can be coupled to an electronic device such as a mobile phone that could comprise a controller.

In the example of FIG. 4 the user 401 is in an environment in which there are multiple audio sources 405. In this example there are three audio sources 405-1, 405-2, 405-3 around the user 401. In the example of FIG. 4 the other audio sources 405 are other people who could be talking. The example scenario of FIG. 4 could be a party or other crowded environment. Examples of the disclosure could also be applied to other scenarios and/or types of audio sources 405.

The different audio sources 405 are located at different distances from the user 401 and their user device 403. In this example the first audio source 405-1 is located closest to the user 401, the third audio source 405-3 is located furthest away from the user 401 and the second audio source 405-2 is located at an intermediate distance between the first audio source 405-1 and the third audio source 405-3.

The user device 403 can be configured to determine which of the audio sources 405 the user 401 is interested in. This can be based on the direction that the user 401 is facing or by any other suitable means. The direction that a user 401 is facing can be determined based on the front direction of the headphones or by using any other suitable criteria. In some cases the direction of an audio source 405 can be determined from microphone signals, for instance by using TDOA (time difference of arrival) from multiple microphones. In such cases the audio source 405 of interest can be assumed to be the loudest audio source. In some cases a video preview could be obtained. In such cases the direction of the video zoom can be assumed to be the direction for audio sources of interest 405 and audio zoom can be applied in that direction.

If it is determined that the user is interested in the first audio source 405-1 the user device 403 can be configured to apply audio zooming processes to captured audio signals so that the user 401 can hear the first audio source 405-1 more clearly.

To apply the appropriate audio zooming process the distance between the user device 403 and the first audio source 405-1 can be determined. Any suitable processes or means can be used to determine the distance between the user device 403 and the respective audio sources 405. For instance, Lidar can be used to determine the distance of objects in the direction in which a user 401 is facing. Camera focus distance can be used in some examples. The use of camera focus can be useful for implementations that make use of video preview. In some examples a distance can be estimated from microphone signals alone using methods based on multiple microphone signal coherence. These methods using microphone signals do not always provide high accuracy but would be usable for implementing examples of the disclosure.

In some examples it can be determined if the first audio source 405-1 is close to the user device 403 or not close to the user device 403. This can determine whether or not the first audio source 405-1 is within a given distance of the user device 403.

In this case it would be determined that the first audio source 405-1 is within a given distance of the user device 403 because the first audio source 405-1 is close to the user 401. Close to the user 401 could mean within 5 m of the user 401 or within any other suitable distance range. The distance range at which an audio source 405 is considered to be close to the user 401 can depend upon the type of audio source 405 the volume of the audio source 405, the ambient noise levels and any other relevant factors.

When the audio source 405-1 is close to the user 401 the sound from the audio source 405-1 typically leaks through the user device 403 acoustically and/or through a pass-through mode. This can result in the user 401 hearing the first audio source 405-1 directly and also hearing the amplified audio signals through the user device 403. This can lead to double talk which is annoying for the user 401.

In this case double talk refers to a user 401 hearing the same audio twice with a delay between the two presentations of the audio. In this case the presentation is from real world sounds that the user 401 hears directly from real world audio sources 405, leaking through headphones, or from headphones pass-through (for example transparency mode). The second presentation is from a user device 403 playing audio through the headphones. The headphones could be part of the user device 403 or could be coupled to a user device such as a mobile phone.

To reduce double talk a first audio zooming process is selected for use in processing the audio signals originating from the first audio source 405-1. The first audio zooming process has a low latency so as to reduce the effects of double talk. The low latency could be less than 10 ms or less than 20 ms. The first audio zooming process is indicated by the arrow 407 in FIG. 4.

If it is determined that the user is interested in the third audio source 405-3 the user device 403 can be configured to apply audio zooming processes to captured audio signals so that the user 401 can hear the third audio source 405-3 more clearly.

A similar process can be applied to enable the appropriate audio zooming process to be used for the third audio source 405-3. In examples of the disclosure a distance between the user device 403 and the third audio source 405-3 can be determined. As with the case of the first audio source 405-1, it can be determined if the third audio source 405-3 is close to the user device 403 or not close to the user device 403. This can determine whether or not the third audio source 405-3 is within a given distance of the user device 403.

In this case it would be determined that the third audio source 405-3 is not within a given distance of the user device 403 because the third audio source 405-3 is far away from the user 401. Far away from the user 401 could mean being more than 10 m away from the user 401 or above any other suitable distance range. The distance range at which an audio source 405 is considered to be far away from the user 401 can depend upon the type of audio source 405 the volume of the audio source 405, the ambient noise levels and any other relevant factors.

When the audio source 405-3 is far away from the user 401 the sound from the audio source 405-3 will not typically leak through the user device 403 acoustically and/or through a pass-through mode. This means that the user 401 won't hear the third audio source 405-1 directly so will not be affected by double-talk.

As the third audio source 405-3 is not affected by double talk a second audio zooming is selected for use in processing the audio signals originating from the third audio source 405-3. The second audio zooming process is indicated by the arrow 409 in FIG. 4.

The second audio zooming process has a high latency because the third audio source 405-3 is not affect by double talk. The high latency could be higher than the latency of the first audio zooming process. The high latency could be more than 50 ms. The higher latency introduced by the second audio zooming process can introduce a delay that is perceptible to the user 401. This would not be problematic because a delay in sounds that are far away is expected by users 401.

The second audio zooming process can introduce a higher level of audio zooming compared to the first audio zooming process. This can provide a larger amplification of the audio from the third audio source 405-3 compared to the first audio source 405-1. The larger amplification might be needed because audio sources 405 that are further away would appear quieter than audio sources 405 that are closer. This larger amplification may need heavier audio processing, which causes more latency to audio processing. That is why the second audio zooming process is used in this case where the third audio source 405-3 is far away from the user 401.

In the example described above there is a binary audio zooming system so that a first audio zoom process is applied if the user 401 is close to the audio source 405 and a second audio zoom process is applied if the user 401 is not close to the audio source 405. In some examples there could be multiple different levels of audio zooming that could introduce different levels of latency based on the distance between the user 401 and the audio source 405. For instance, in the example of FIG. 4 the second audio source 405-2 is located between the first audio source 405-1 and the third audio source 405-3. In this case, if it is determined that the user 401 is interested in the second audio source 405-2 and an audio zooming process can be selected based on the distance between the user device 403 and the second audio source 405-2. The audio zooming process that is selected for the second audio source 405-2 can have a higher latency than the first audio zooming process but a lower latency than the second audio zooming process.

FIG. 5 shows another example use case scenario for examples of the disclosure. In FIG. 5 a user 401 is listening to audio playback though their user device 403. In this example the user device 403 comprises a set of headphones. Other types of user device 403 could be used in other examples. The user device 403 can comprise a controller as shown above or can be coupled to an electronic device such as a mobile phone that could comprise a controller.

In the example of FIG. 5 the user 401 is in a different environment in which there are multiple audio sources 405. In this example there are three audio sources 405-1, 405-2, 405-3 around the user 401. In the example of FIG. 4 the first audio source 405-1 and the third audio source 405-3 are people who could be talking and the second audio source 405-2 is a road with vehicles making noise. Examples of the disclosure could also be applied to other sound scenarios and/or types of audio sources.

In this example the first audio source 405-1 is located close to the user 401 and the third audio source 405-3 is located far away from the user 401. The third audio source 405-3 is located on the other side of the road to the user 401.

The road between the user and the third audio source 405-3 can make the third audio source much harder to hear without the use of audio zooming.

If it is determined that the user is interested in the first audio source 405-1, that is close to the user 401, the user device 403 can be configured to apply audio zooming processes to captured audio signals so that the user 401 can hear the first audio source 405-1 more clearly. The audio zooming process that is applied can be a low latency process because the user 401 can hear the first audio source 405-1 leaking through the user device 403 and/or through pass through mode.

In addition to the low latency or pass-through process the audio zooming process can also comprise the attenuation of sounds that are similar to the audio source 405-1 of interest. This can help to remove the effects of double talk.

To enable sounds that are similar to the audio source 405-1 to be attenuated characteristics of the audio source 405-1 can be identified. Audio sources having similar characteristics can then be attenuated from the non-zoomed audio. For instance, in the example of FIG. 5 the first audio source 405-1 is a person talking and so the speech frequencies can be identified and attenuated in the non-zoomed audio. If it is determined that the user is interested in the third audio source 405-3, that is far away from the user 401, the user device 403 can be configured to apply audio zooming processes to captured audio signals so that the user 401 can hear the third audio source 405-3 more clearly. The audio zooming process that is applied can be a high latency process because the third audio source 405-3 is far away and so needs to be amplified a lot. Also the latency in the third audio source 405-3 is not disturbing to the user 401 because the user can't hear the third audio source 405-3 acoustically or in a pass through mode. Also a latency in far-away audio sources 405-3 is expected by humans psychoacoustically. The audio zooming process can amplify the audio source 405-3 so that the user 401 can hear it over the sound of the road.

FIG. 6 shows another example use case scenario. In this example a user 401 is recording video using an electronic device 203. The electronic device 203 could be a mobile phone or any other suitable type of user device.

The electronic device 203 can stream audio to a peripheral device 205. In this example the peripheral device comprises headphones that are being worn by the user. The headphones can be configured to present audio to the user 401.

In the example of FIG. 6 there are multiple audio sources 405 around the user 401. In the example of FIG. 6 a first audio source 405-1 is located behind the user 401 and a second audio source 405-2 and a third audio source 405-3 are located in front of the user 401. In this example the first audio source 405-1 is a vehicle and the second and third audio sources 405-2, 405-3 are birds.

In the example of FIG. 6 the user 401 is using the electronic device 203 to capture video comprising the birds. The audio that is used for the video can be processed using high latency audio zoom processing so that good levels of amplification can be achieved. This processed audio can be stored with the video and played back at a later time.

However, the audio that is processed using the high latency methods might not be appropriate to playback to the user 401 over the headphones while the video is being captured because this could result in double talk. Therefore, to prevent this the audio that is presented while the video is being captured can be processed with an audio zooming method that is, at least in part, selected based on the distance between the electronic device 203 and the audio source 405 in the video.

In this example there are two audio sources 405-2, 405-3 in front of the user 401. The audio source that is being captured in the video can be determined based on the orientation of the electronic device 203, the zooming of the video capture and/or any other suitable factor.

Once the audio source 405 that is being captured in the video has been determined the distance to that audio source 405 can be determined. The audio zooming process that is to be used in the audio preview can then be selected based on that distance.

Audio sources 405 that are not in the video can be processed using low latency because the user 401 can hear these audio sources 405 leaking through the user device 403 and/or through pass through mode for the audio preview. This can alert the user to the presence of the objects. In the example of FIG. 6 the vehicle is located behind the user 401 so the user might not see it. By enabling audio generated by the vehicle to be processed with low latency this can ensure that the user 401 is aware of the audio source 405 and does not become surprised by its presence.

The zoomed audio for the audio sources of interest and the ambient audio can then be mixed to be present to the user 401 for preview with the video images. This can generate a mix that is close to the audio that would be created for the video while enabling the user to be made aware of other audio sources in the vicinity.

Examples of the disclosure therefore provide the benefit that audio zooming can be used for audio scenes having multiple audio sources 405 without introducing a problematic delay.

In the examples shown in FIGS. 4 to 6 the zoomed audio is presented to a user 401 via headphones. Other means for presenting audio to a user 401 could be used in other examples. For instance, two or more external speakers could be used or any other suitable means.

The zoomed audio can be presented alone or the zoomed audio can be mixed with ambient audio. The ambient audio can be processed using low latency processing because the user 401 can hear the ambient audio leaking through the user device 403 and/or through pass through mode. The ambient audio could be direct microphone signals or substantially direct microphone signals. Some stereo or low latency spatial processing, or any other suitable type of processing, can be applied to the microphone signals to obtain the ambient audio.

The controller or apparatus 101 can also be configured to perform additional audio processing that is not described here. Such processing can comprise, automatic gain control, compression, noise cancellation, wind noise cancellation, equalization, or any other suitable type of processing.

The above-described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The apparatus can be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples, the apparatus can be provided in a mobile terminal, other types of electronic devices, such as, but not limited to: mobile communication devices, hand portable electronic devices, wearable computing devices, portable digital assistants (PDAs), pagers, mobile computers, desktop computers, televisions, gaming devices, laptop computers, cameras, video recorders, GPS devices and other types of electronic systems, can readily employ examples of the present disclosure. Furthermore, devices can readily employ examples of the present disclosure regardless of their intent to provide mobility.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a', 'an' or 'the' is used in this document with an inclusive not an exclusive meaning. That is any reference to X comprising a/an/the Y indicates that X may comprise only one Y or may comprise more than one Y unless the context clearly indicates the contrary. If it is intended to use 'a', 'an' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus, comprising:

at least one processor; and at least one memory storing instructions that, when executed by the at least one processor, cause the apparatus at least to:

determine if an audio source is within a given distance of a user device; and select an audio zooming process for the audio source based on whether or not the audio source is within the given distance of the user device such that, if the audio source is within the given distance of the user device a first audio zooming process is used and if the audio source is not within the given distance of the user device a second audio zooming process is used, wherein the second audio zooming process has a higher latency and greater amplification than the first audio zooming process.

2. The apparatus as claimed in claim 1, wherein the second audio zooming process provides a higher level of audio zooming than the first audio zooming process.

3. The apparatus as claimed in claim 1, wherein the first audio zooming process comprises no audio zooming.

4. The apparatus as claimed in claim 1, wherein the audio source is within the given distance of the user device in an instance in which the audio source is at a distance from the user device at which sound from the audio source leaks through the user device acoustically and/or through a pass-through mode, and wherein the first audio zooming process has a lower latency than the second audio zooming process.

5. The apparatus as claimed in claim 1, wherein the apparatus is further caused to use a mix of the first audio zooming process and the second audio zooming process for an audio source that is not within the given distance but is within a further distance of the user device.

6. The apparatus as claimed in claim 5, wherein the apparatus is further caused to control the combination so that a higher level of audio zooming is applied to audio sources that are further away from the user device.

7. The apparatus as claimed in claim 1, wherein the apparatus is further caused to detect one or more characteristics of the audio source and attenuating the one or more characteristic from non-zoomed audio.

8. The apparatus as claimed in claim 7, wherein the characteristics comprise characteristics of human voice.

9. The apparatus as claimed in claim 1, wherein the apparatus is further caused to determine an audio source that a user is listening to, wherein determination is based on the user's head position.

10. The apparatus as claimed in claim 1, wherein the audio zooming comprises at least one of: beamforming, spatial filtering or machine learning based methods.

11. The apparatus as claimed in claim 1, wherein apparatus is comprised by an electronic device.

12. A method comprising:

determining if an audio source is within a given distance of a user device; and selecting an audio zooming process for the audio source based on whether or not the audio source is within the given distance of the user device such that, if the audio source is within the given distance of the user device a first audio zooming process is used and if the audio source is not within the given distance of the user device a second audio zooming process is used, wherein the second audio zooming process has a higher latency and greater amplification than the first audio zooming process.

13. The method as claimed in claim 12, wherein the second audio zooming process provides a higher level of audio zooming than the first audio zooming process.

14. The method as claimed in claim 12, wherein the first audio zooming process comprises no audio zooming.

15. The method as claimed in claim 12, wherein the audio source is within the given distance of the user device in an instance in which the audio source is at a distance from the user device at which sound from the audio source leaks through the user device acoustically and/or through a pass-through mode, and wherein the first audio zooming process has a lower latency than the second audio zooming process.

16. The method as claimed in claim 12, further comprising using a mix of the first audio zooming process and the second audio zooming process for an audio source that is not within the given distance but is within a further distance of the user device.

17. The method as claimed in claim 16, further comprising controlling the combination so that a higher level of audio zooming is applied to audio sources that are further away from the user device.

18. The method as claimed in claim 12, further comprising detecting one or more characteristics of the audio source and attenuating the one or more characteristic from non-zoomed audio.

19. The method as claimed in claim 18, wherein the characteristics comprise characteristics of human voice.

20. A non-transitory computer readable medium comprising program instructions stored thereon for performing at least the following:

determining if an audio source is within a given distance of a user device; and selecting an audio zooming process for the audio source based on whether or not the audio source is within the given distance of the user device such that, if the audio source is within the given distance of the user device a first audio zooming process is used and if the audio source is not within the given distance of the user device a second audio zooming process is used, wherein the second audio zooming process has a higher latency and greater amplification than the first audio zooming process.

* * * * *